United States Patent
Xiao et al.

(10) Patent No.: US 10,387,578 B1
(45) Date of Patent: Aug. 20, 2019

(54) UTILIZATION LIMITING FOR NESTED OBJECT QUERIES

(71) Applicant: Amazon Technologies, Inc., Seattle, WA (US)

(72) Inventors: Wei Xiao, Seattle, WA (US); David Craig Yanacek, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 638 days.

(21) Appl. No.: 14/868,181

(22) Filed: Sep. 28, 2015

(51) Int. Cl.
*G06F 17/30* (2006.01)

(52) U.S. Cl.
CPC .. *G06F 17/30395* (2013.01); *G06F 17/30483* (2013.01)

(58) Field of Classification Search
CPC ................................................. G06F 17/30395
See application file for complete search history.

(56) References Cited

U.S. PATENT DOCUMENTS

| | | | | |
|---|---|---|---|---|
| 7,058,622 | B1 * | 6/2006 | Tedesco | G06F 17/30595 |
| 2007/0244860 | A1 * | 10/2007 | Carlson | G06F 17/30938 |
| 2014/0101135 | A1 * | 4/2014 | Yousaf | G06F 17/30442 707/722 |
| 2014/0279838 | A1 * | 9/2014 | Tsirogiannis | G06F 17/30292 707/603 |
| 2014/0279905 | A1 * | 9/2014 | Muniswamy-Reddy | G06F 11/20 707/639 |
| 2014/0344312 | A1 * | 11/2014 | Yanacek | G06F 17/30595 707/804 |

* cited by examiner

*Primary Examiner* — Mahesh H Dwivedi
(74) *Attorney, Agent, or Firm* — Davis Wright Tremaine LLP

(57) ABSTRACT

Capacity utilization may be controlled by a token-based allocation of input/output capacity. Operations on nested objects may utilize capacity based on factors other than input/output capacity. A capacity utilization model may be used to scale input/output utilization associated with an operation on a nested object so that the scaled input/output utilization correlates to the computing capacity used performing the operation on the nested object. The correlation may be determined to be valid for a range of attributes associated with the operation.

19 Claims, 11 Drawing Sheets

UTILIZATION LIMITING FOR NESTED OBJECT QUERIES

BACKGROUND

A provider may host a distributed database management system on behalf of various clients. The provider may limit utilization of the computing nodes that make up the database management system for various reasons, such as providing a minimum quality-of-service level. To do so, the provider may provision a certain amount of computing capacity to each client, and limit operations that may be performed on behalf of a client once that amount has been exceeded. This approach may rely on a means of estimating the amount of computing capacity that would be consumed by performing an operation on behalf of the client. Certain measures of capacity utilization, such as input/output utilization, are useful for this purpose because they may be readily ascertained.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
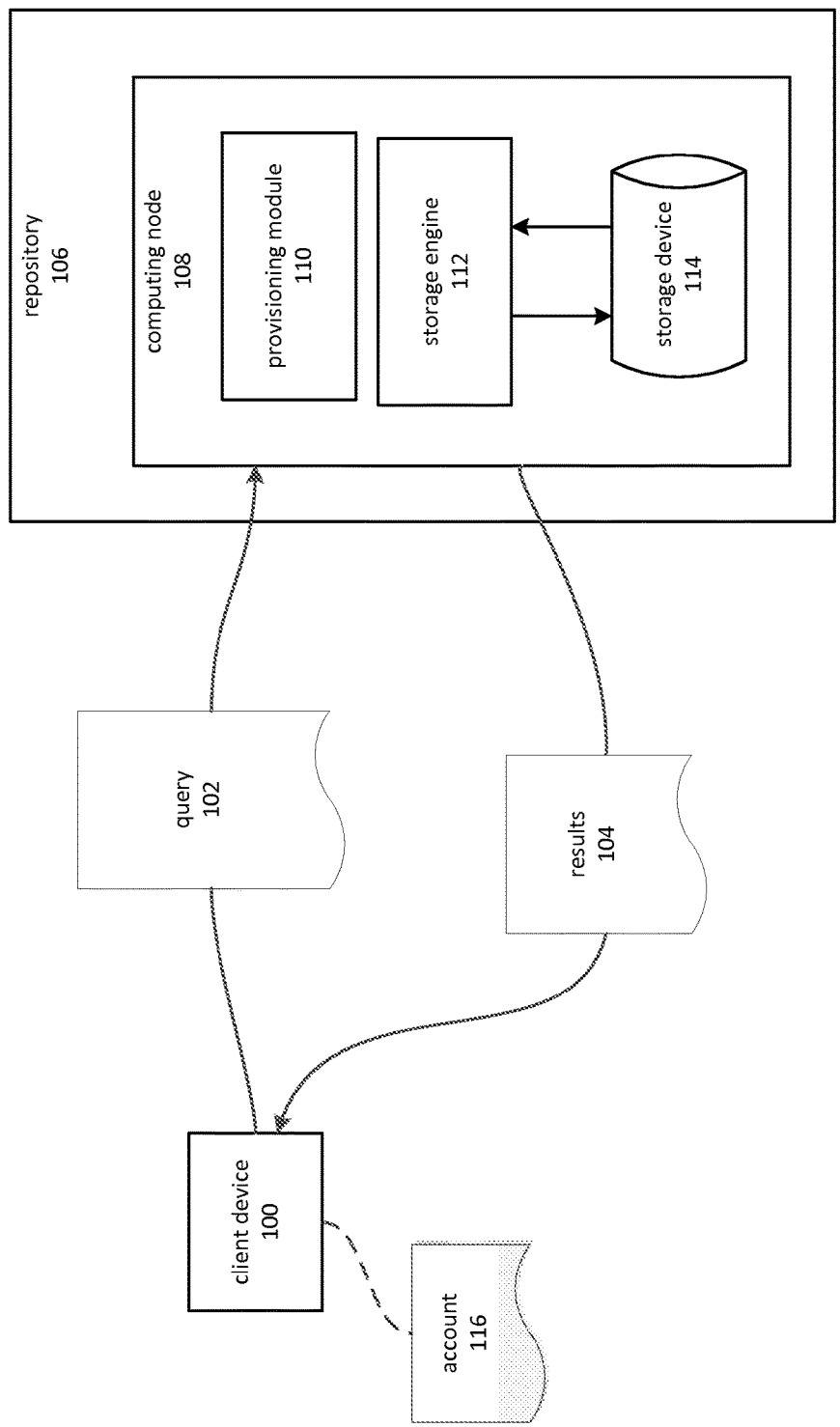
FIG. 1 is a block diagram depicting an example of a system configured as a repository for nested objects.

Disclosed herein are systems, methods, and computer program products for controlling capacity utilization in a distributed database management system. The distributed database management system may contain nested objects which may be returned as the result of a query and which may themselves be queried. For example, a nested object might be representative of a large document, such as a book containing a number of chapters. A query of the database might locate a record containing the book, retrieve all or some of the book, and search within the book to find a certain passage. Due to the potentially complex nature of these types of operations, conventional means of estimating or measuring the computing capacity needed to process a query of a nested object may be inadequate.

A technique for controlling capacity utilization may involve a token bucket mechanism in which tokens representative of computing capacity are placed into a bucket associated with an account of a client of the distributed database management system. Tokens may be placed into the bucket on an ongoing basis and withdrawn when a query is performed. The amount of tokens that are withdrawn may be based on an estimate of the computing capacity that would be used to perform the query. The token-based method may rely on a relatively predictable measure of computing capacity for various reasons, including ensuring that the estimate of each token's worth is accurate. One such measure is input/output utilization, because it may be readily predicted based on the sizes of objects involved in a query.

The aforementioned technique may be relatively effective for scalar values and some types of more complex objects. However, for nested objects, input/output utilization may not be inherently predictive. This may be the case for a number of reasons, among which is that queries of nested objects may be central-processing unit ("CPU") intensive. This means that processing queries of nested objects may have CPU utilization, rather than input/output utilization, as a primary limiting factor. In other words, the ability of a computing node to process queries of network objects may be limited by the CPU. It may, however, be difficult to predict the CPU utilization likely to be seen when a query is processed.

An aspect of the present disclosure involves a distributed database management system that maintains a collection of items, including nested objects. The system may provide client devices with access to the collection via queries, which can be requests to store data in the collection, or to retrieve data from it. The queries may also involve various expressions, functions, conditional operators, and so forth.

In order to control capacity utilization, the operator of the database, sometimes called a provider, may associate an account with a maximum amount of input/output capacity that may be utilized to process queries on behalf of the account.

The database may receive a request to access a nested object. The request may include a specification of a query and information that associates the request with the account. The query may be analyzed to determine if it conforms to a capacity utilization model that correlates central processing unit utilization, and other capacity utilization measures, to input/output utilization. In other words, subject to certain constraints, the capacity utilization of a query may be predicted based on a measure of input/output utilization—such as a nested object's size—rather than some other factor such as CPU utilization. This may be the case even when the other factor is the predominate factor in capacity utilization.

Accordingly, in various instances a capacity utilization model may be used to form a measure of capacity utilization that is expressed in terms of input/output utilization. A benefit of this approach is that it is consistent with the means used to control capacity utilization for other types of data—as noted, input/output utilization is generally a predictive measure of true capacity utilization for scalar objects and some types of more complex objects. However, the model may not be accurate outside certain parameters. Accordingly, the query may be analyzed to determine if its attributes fall within certain ranges. For example, the query may be analyzed to determine that the number of operators in the query is less than a threshold amount, that the number of operands provided to certain types of operators is less than a threshold amount, and that the maximum level of operator nesting is less than a threshold amount.

If the query conforms to these parameters, the capacity utilization model may be used to identify a number of tokens that are required to be in the token bucket associated with the account in order for the query to be performed.

FIG. 1 is a block diagram depicting an example of a system configured as a repository for nested objects. A client device 100 may transmit a query 102 to computing node 108, which may be a component of a repository 106. The repository 106 may maintain a collection of data items by supporting operations to store and retrieve data items from the collection. Examples of a repository include database systems such as relational databases and non-relational databases, such as NoSQL databases.

In some instances, for example, the repository 106 may comprise the computing node 108. The computing node 108 may be configured as a partition of a distributed key-value database system. In a key-value database system, items may be stored in the repository with reference to a key value, which identifies items stored on the storage device 114. The item may be indexed using the key value. In order to retrieve the item, client device 100 may issue the query 102 with the key included in the query. The results 104 may include the item.

An item may consist of one or more values. In some cases, one or more of the values may be scalar values or non-nested objects. In other cases, one or more of the values that make up an item may be nested objects. A scalar value includes single-value types such as integers, floating point numbers, strings, characters, Booleans, and so forth. Non-nested objects may include more complex types, such as structures containing multiple values. A nested object, on the other hand, may be an object consisting of a hierarchy of sub-objects. Note, however, that in some cases nested objects may have a relatively flat hierarchy, such as arrays, lists, or maps. One example of a nested object is a JavaScript Object Notation ("JSON") object.

The repository 106 may support instances of the query 102 in which the processing of a nested object is involved. The processing may include storage or retrieval of the nested object in its entirety, or it may involve storage and retrieval of parts of the object, such as storage and retrieval of certain regions of the hierarchy of sub-objects that makes up the nested object. The processing of the query 102 may also involve evaluating expressions, conditions, and functions involving or using portions of the nested object.

In some instances, the query 102 may involve non-nested objects or scalar values. For these types, the processing may also involve storage of retrieval of the non-nested object or scalar value in its entirety. The query 102 may also involve processing of a portion of the object or scalar value—one example being operations on a subset of a string of characters—but in general the computing capacity utilized by performing a query involving scalar or non-nested objects may be more proportional to the size of the object than is the case with nested objects. With nested objects, it may be the case that the processing of query 102 for relatively small nested objects may still be complex and require a significant proportion of the capacity of computing node 108.

The processing of the query 102 may involve a storage engine 112 interacting with storage device 114 to store and retrieve objects. The storage engine 112 may interact with provisioning module 110 to determine whether there is sufficient capacity of computing node 108 reserved to perform operations on behalf of an account 116 associated with the operation of client device 100. The account 116 may be related to a provider-customer relationship between the operator of the repository 106 and the operator of client device 100. In some cases, the operator of client device 100 may be a customer of another party, and that party has account 116 with the operator of repository 106.

In the case of scalar values and non-nested objects, the provisioning module 110 may determine whether a request may be processed on behalf of account 116 based on the size of the scalar value or non-nested objects that are accessed. The provisioning module 110 may, for example, determine an amount of data transferred as a result of processing the query 102 and deduct that amount from a running total, or "bucket" of available capacity. This approach, however, may be inaccurate when nested objects are involved, due to the potential complexity of processing the query 102 on a nested object.

For a query 102 that involves a nested object, the provisioning module 110 may correlate various properties of the query 102 to the size of the nested object, or more generally to the input/output capacity utilized regarding the nested object. A capacity utilization model, which might also be described as a cost model, might be used to obtain a value that is expressed as units of input/output utilization but is nevertheless indicative of other aspects of capacity utilization, such as CPU utilization, that are relevant to the ability of computing node 108 to process the query 102 on behalf of account 116.

Figure 2:
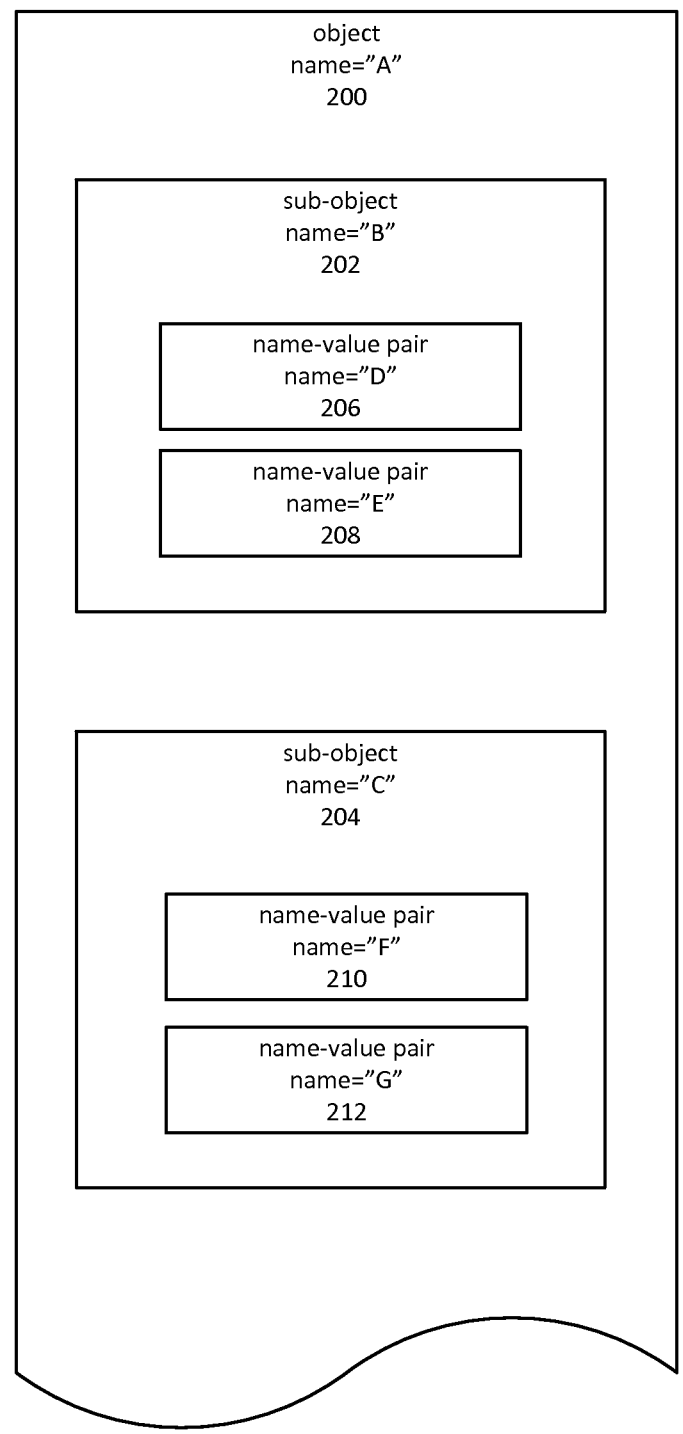
FIG. 2 is a block diagram depicting an example of a nested object.

FIG. 2 is a block diagram depicting an example of a nested object. Other examples might include arrays, lists, or other structures. Some of these structures may be "flat" hierarchies, such as an array or a list of simple objects, sometimes referred to as values, such as strings, integers, or floating point numbers. An array, list, or other structure may, however, contain a number of nested sub-objects.

In the example of FIG. 2, a nested object 200 may consist of a hierarchy of objects, which may be referred to as sub-objects. By way of example, FIG. 2 depicts sub-objects 202 and 204 as children in an object hierarchy that has a parent nested object 200 as a root. A nested object or its sub-objects may include additional data in a variety of forms, one example of which is the name-value pairs depicted in FIG. 2 as name-value pairs 206-212. A name-value pair may be described as a sub-object comprising two sub-objects: a name sub-object and a value sub-object. Although not required, there may be names associated with any of the sub-objects in the hierarchy. For example, object 200 might have a name of "A," sub-object 202 might have a name of "B," and so on.

The nested object 200, sub-objects 202 and 204, and name-value pairs 206-212 may be associated with names, which may serve as identifiers for the corresponding values or sub-objects. The names of the sub-objects may be concatenated or otherwise joined to express a path identifier, which may be used to locate a particular sub-object or a region of the hierarchy of sub-objects having the identified object as its root. Queries of an nested object may utilize path identifiers in various expressions, such as "A.C.D<A.B.E" or "A.C.F=5."

Figure 3:
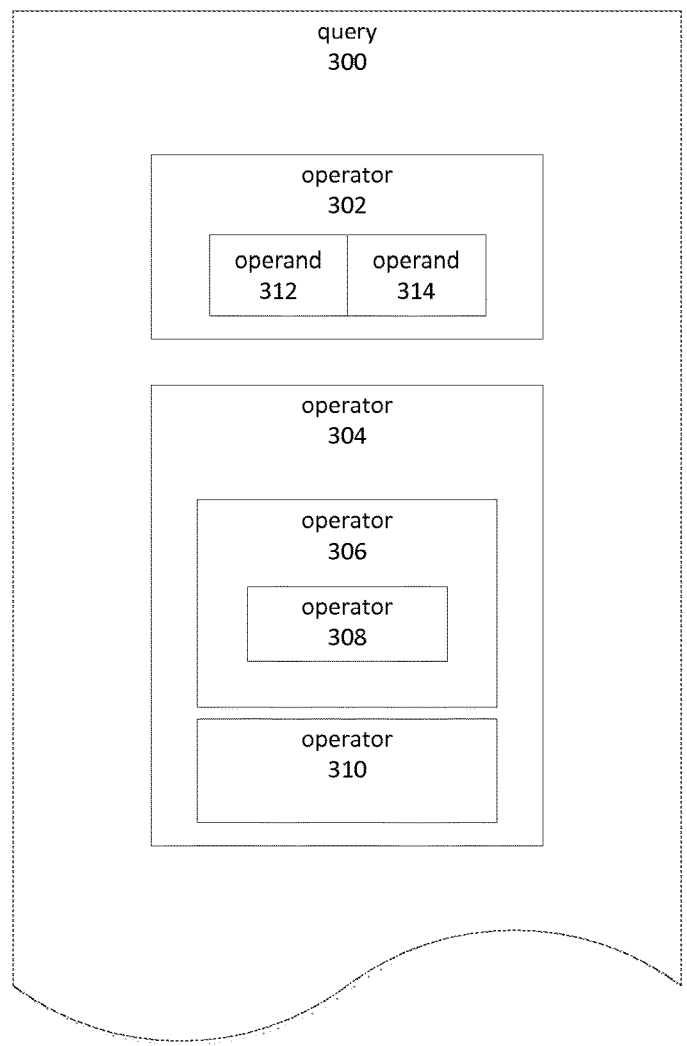
FIG. 3 is a block diagram depicting attributes of a query of a nested object.

FIG. 3 is a block diagram depicting attributes of a query of a nested object. Attributes such as those depicted in FIG. 3 may be used by the provisioning module 110 depicted in FIG. 1 to determine an amount of input/output utilization that may be attributed to an account when a the query is performed. The attributes may also be utilized to determine the validity of a capacity utilization model that determines an estimated amount of capacity that may be utilized if the query is performed.

A query 300 may contain a number of different operators 302-310. The term "operator" may include comparison operators such as less than, greater than, or equal to, assignment operators such as "=" or "SET," containment operators such as "IN" or "CONTAINS," and so on. These examples are not intended to limit the scope of the present disclosure to only the specific examples listed. In general, an operator may include any of various functions, methods, procedures, or subroutines. Attributes of the query 300 may include the number of operators 302-310, and the type or identity of the various operators 302-310.

The operators 302-310 may in some cases reference various operands 312-314. An operand can include various constant values, references to values, path indicators referring to a portion of a nested object, and references to additional operators. Attributes of the query 300 may include a number of operands associated with various operators, including globally (i.e. across all of operators 302-310) or to the number of operands associated with specific operators or specific types of operators. For example, certain operators, such as "IN" or "CONTAINS," might be associated with an attribute indicative of the number of operands provided to the "IN" or "CONTAINS" operator.

The query 300 may also have an attribute related to nesting level. Nesting level may, for example, refer to operators that in turn reference other operators. For example, operator 304 is depicted in FIG. 3 as referencing operators 306 and 310. Operator 306 is depicted in FIG. 3 as referencing operator 308. Accordingly, one property of query 300 is that it has a maximum nesting level of three, since operator 304 references operator 306, which then references operator 308.

The query 300 may have other attributes not explicitly depicted. Examples include the presence of specific operators, the restrictiveness or lack thereof of filtering operations, the number of fields in a projection, and so on. In some cases, the provisioning module 110 may rely on information obtained from a component such as the storage engine 112, as depicted in FIG. 1, or other components such as a query optimizer. The information relied on by the provisioning module may include information obtained from parsing the query, from analyzing the structure of the query, e.g., by lexical analysis, and from forming a query plan for the performing the query 300.

The attributes of the query 300 may be related to various resources consumed to process the query. For example, the number of operators, the nesting level, and the number of operands provided to certain operators may be correlated to increased CPU utilization. In another example, the use of filter or "WHERE" clauses might be correlated with bandwidth utilization. However, the provisioning module 110 may measures capacity in units of input/output utilization. Other types of resource utilization may not be directly translatable to input/output utilization. However, in various instances an adjustment factor may be used to convert other types of resource utilization to a value, in units of input/output utilization, that is reasonable to attribute to an account when a query is performed on the account's behalf.

Figure 4A:
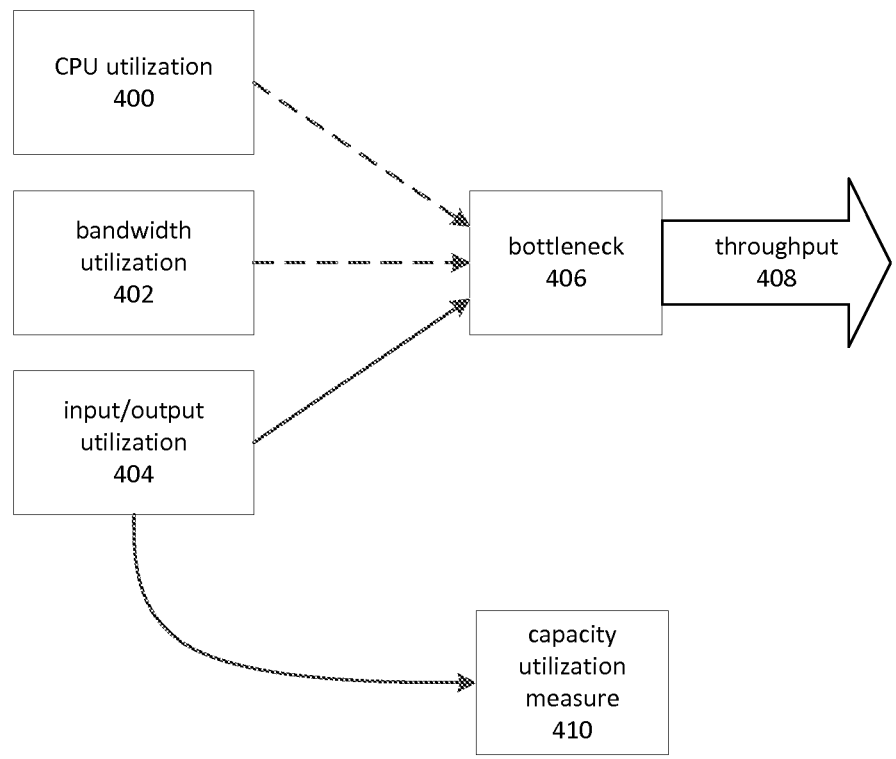
FIG. 4A is a block diagram depicting formation of a capacity utilization measure based on input/output utilization.

FIG. 4A is a block diagram depicting formation of a capacity utilization measure based on input/output utilization. FIG. 4A depicts various examples of aspects of a computing node's capacity that may be utilized during processing of a query. The depicted examples, which are not intended to limit the scope of the present disclosure, include CPU utilization 400, bandwidth utilization 402, and input/output utilization 404.

In some instances it may be the case that input/output utilization 404 is at a level that results in a bottleneck 406 and results in some level of throughput 408. In other words, in the example depicted by FIG. 4, input/output utilization 404 may be said to be the limiting capacity measure. For example, if the computing nodes ability to process input/output were increased, the limits imposed by the bottleneck 406 might be lifted and throughput 408 could increase, assuming that some other factor such as CPU utilization 400 or bandwidth 402 did not become the primary limiting factor.

A capacity utilization measure 410 may be based on input/output utilization 404 being a primary limiting factor in the ability of a computing node to process queries on behalf of an account. For example, a sustainable amount of input/output utilization 404—such as an amount of input/output utilization 404 before the utilization causes bottleneck 404—may be considered to be a maximum amount of input/output utilization that may be performed on behalf of one or more accounts. If more than one account is being served, the maximum amount may be apportioned between them. Each account may be said to have been provisioned with a certain amount of capacity, and that amount may be measured in units of input/output utilization 404. Note, however, that the value might be presented in terms of some generic unit, such as a token, a credit, or a percentage.

The use of input/output utilization 404 as the basis for a provisioning scheme may be associated with more accurate predictions of the capacity that will be utilized by performing a query. For example, if a query involves retrieving an object, the size of the object may be readily determined before the object is retrieved from a storage device.

Figure 4B:
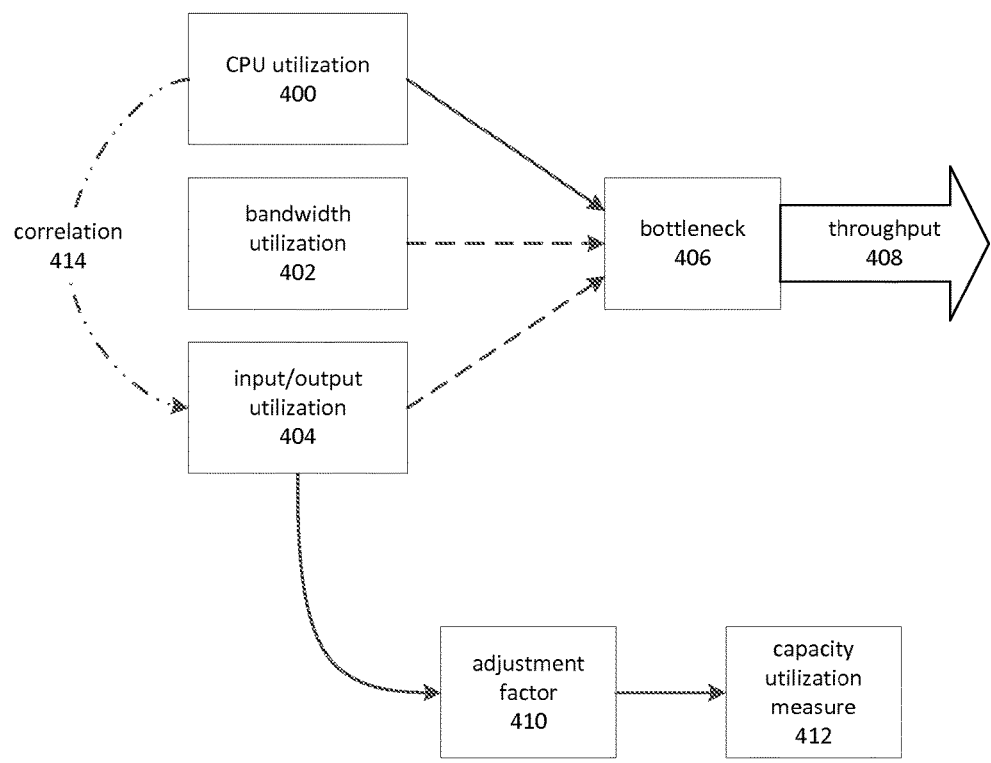
FIG. 4B is a block diagram depicting formation of a capacity utilization measure based on correlation between input/output utilization and a utilization factor other than input/output utilization.

This may not be the case with other utilization factors. As described herein, in various aspects a correlation may be determined between input/output utilization and another utilization factor. FIG. 4B is a block diagram depicting formation of a capacity utilization measure based on correlation between input/output utilization and a utilization factor other than input/output utilization. In the example of FIG. 4B, utilization factors such as CPU utilization 400, bandwidth utilization 402, and input/output utilization 404 may be involved in processing a query. However, for illustrative purposes, it may be presumed that in the example of FIG. 4B that CPU utilization 400, rather than input/output utilization 404, is the cause of bottleneck 406, which in turn limits throughput 408.

A correlation 414 may be established between CPU utilization 400 and input/output utilization 404. The correlation 414 involves a relationship between the two factors, or more specifically an adjustment factor which serves as an approximation as a relationship between CPU utilization 400 and input/output utilization 404. For example, 100% CPU utilization 400 might be correlated on a one-to-one basis with 20 units of input/output utilization 404. This might then be reflected in an adjustment factor 410, which might apply a 20x scaling factor to input/output utilization 404 to determine an amount of input/output utilization that is estimated to be consumed by processing a query. This amount may then be used as the capacity utilization measure 412.

Figure 5:
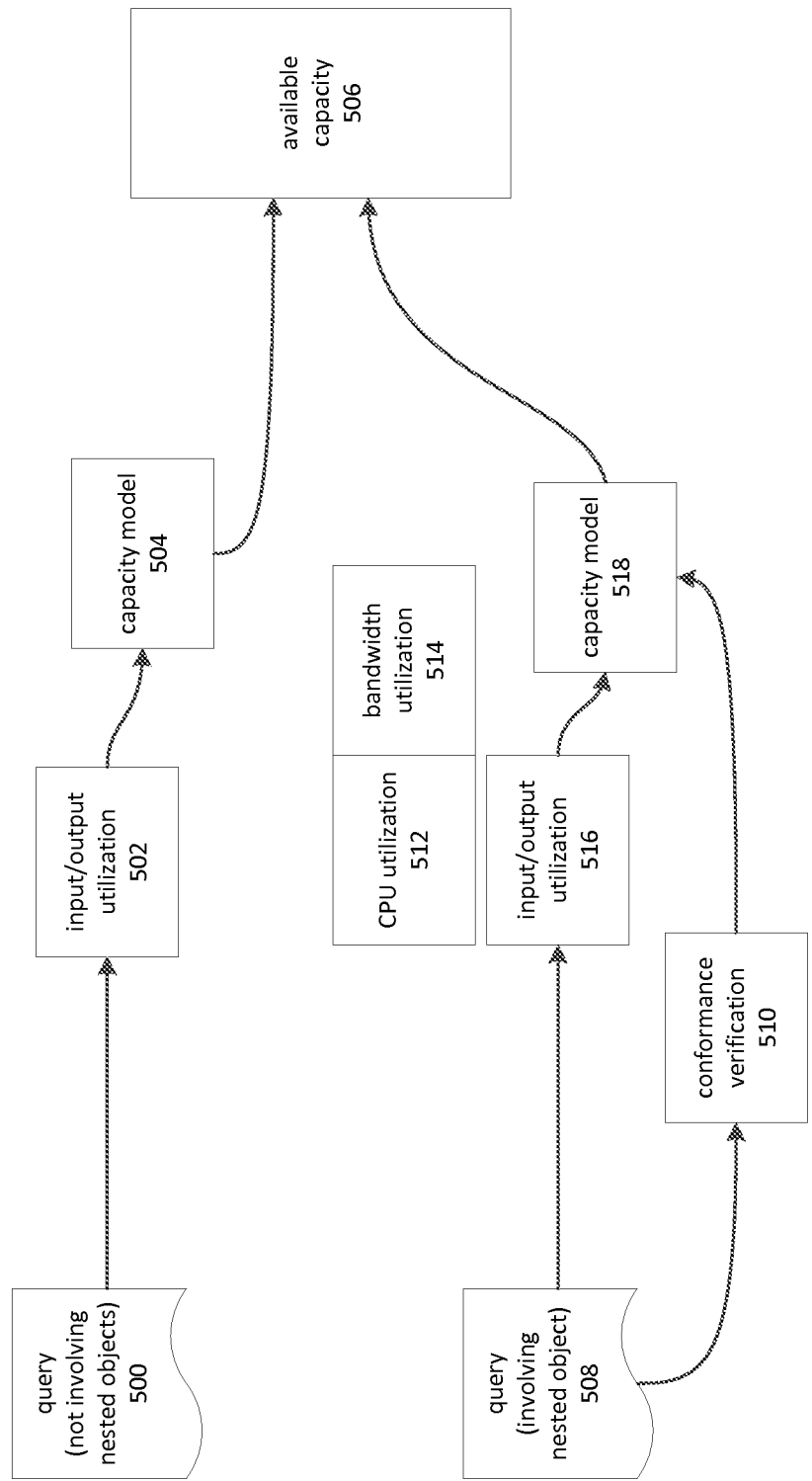
FIG. 5 is a block diagram depicting capacity utilization models.

FIG. 5 is a block diagram depicting capacity utilization models. A capacity utilization model may include a module, loaded into the memory of a computing node and executing, which calculates a value indicative of an estimated amount of capacity that has been or may be used processing a query.

FIG. 5 depicts two capacity utilization models 504 and 518. The first capacity utilization model 504 may be used for a query 500 involving non-nested object or a scalar values. The predicted input/output utilization 502 may be the input to the capacity model 504, which may in turn be compared with available capacity 506 to determine if a query may be performed on behalf of an account.

For query 500, which does not involve nested objects, the capacity model 504 may be a one-to-one mapping between a metric indicative of input/output utilization 502, such as the size of the non-nested objects, and amount of data to be transferred, and so forth.

A second query 508 may involve a nested object. Processing of the second query 508 may involve input/output utilization 516, and may also involve CPU utilization 512, bandwidth utilization 514, and other factors. It may also be the case that when processing the query 508, the CPU utilization 512, bandwidth utilization 514, or some other factor may be a potentially determinative factor regarding the capacity for processing the query. However, input/output utilization 516 may still be used as input to a capacity model 518. The capacity model 518 may apply a scaling factor or function to the input/output utilization 516 so that it is more representative of the overall capacity that may be or is utilized to process the query 508, even though it is measured and/or expressed based on input/output utilization 516. The output of the capacity model 518 may be applied to available capacity 506 to determine if the account associated with the query has sufficient capacity to have the query performed on its behalf.

The available capacity 506 may, in some instances, comprise a bucket of tokens that are representative of input/output capacity. The bucket may be associated with an account. When operations are performed on behalf of the account, tokens may be removed in proportion to the amount of work associated with the request. As noted, the amount of work may be associated with the input/output utilization associated with the request, due in part to the relative ease with which the input/output utilization related to a particular request can be determined. To determine if a query may be processed on behalf of an account, the number of tokens in the bucket may be compared to an amount of capacity that the request is predicted to consume. When the capacity is measured in terms of input/output utilization, and the nature of the query is such that input/output utilization is a predominate limiting factor in the ability of a computing node to process the query, a prediction may be made accurately by capacity model 504.

There may, however, be limits to the predictive properties of the capacity model 518, or its accuracy, based on various attributes of the query 508. Conformance verification 510 may be performed by a provisioning module to determine if a capacity model 518 is applicable. In some instances, a model may be selected based on the conformance of the query 508 attributes to the parameters of the selected capacity model 518. In some instances, the query 508 may be rejected if its attributes do not conform to the expectations of the capacity model 518.

Figure 6:
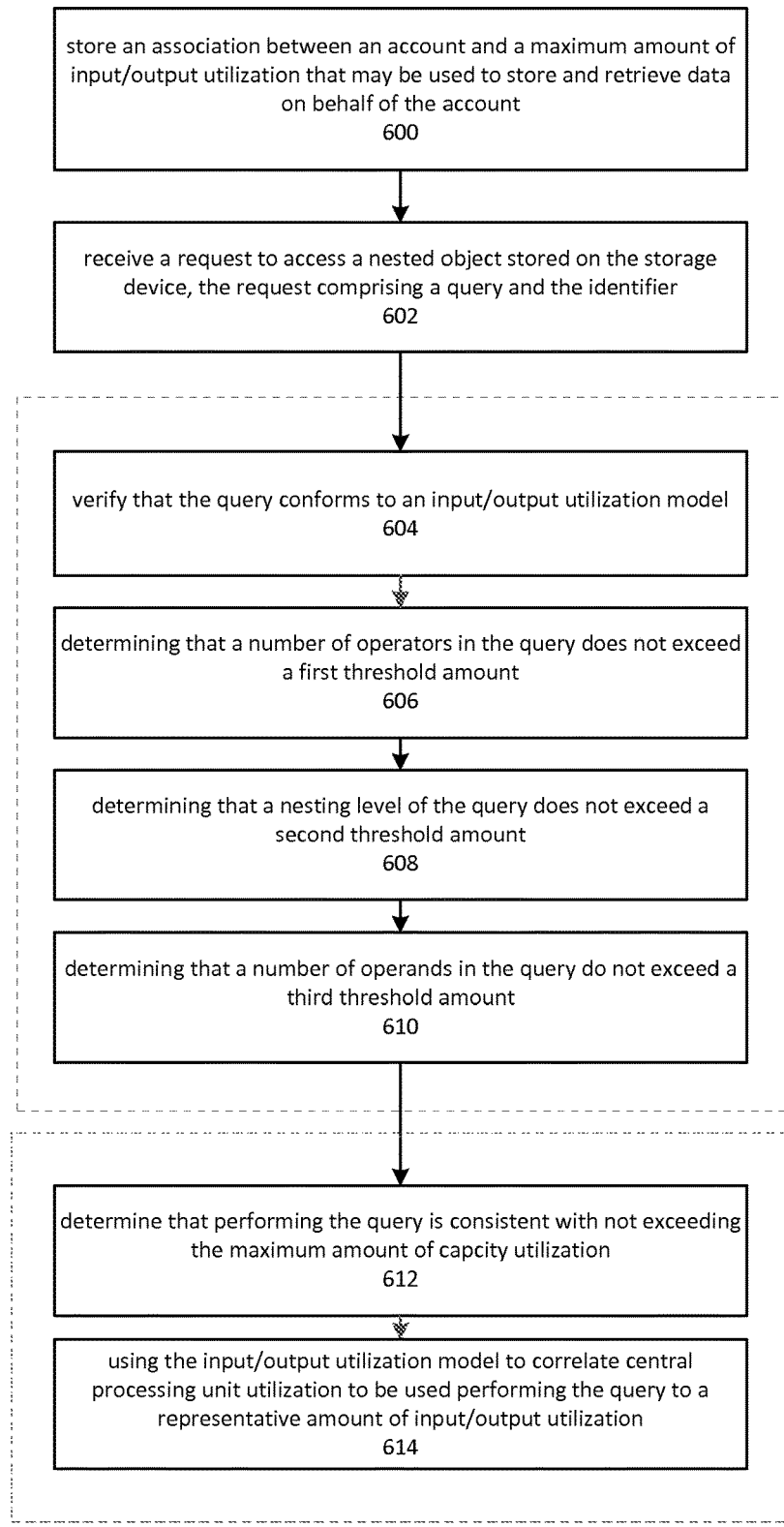
FIG. 6, which is a flow diagram depicting applying a capacity utilization model for a query of a nested object.

Aspects of the disclosure may be better understood in view of FIG. 6, which is a flow diagram depicting applying a capacity utilization model for a query of a nested object. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 600 depicts associating an account with a maximum amount of input/output utilization that may be used to store and retrieve data on behalf of the account. The association may comprise linking an account identifier with a token bucket and an associated rate for refilling the token bucket.

Block 602 depicts receiving a request to access a nested object stored on the storage device, where the request comprises a specification of a query and information linking the request to the account. The request may, for example, include an identifier of the account. The specification of the query may take various forms, including textual representations of a query. In other cases, the query may be represented by a binary tree.

Block 604 depicts verifying that the query conforms to an input/output utilization model. The verification may include the operations depicted in blocks 606-610. A provisioning module, query optimizer, and/or storage engine may participate in the verification. For example, the query optimizer may parse the query and identify attributes of the query, while the provisioning module may compare the attributes obtained from the query to those of the input/output utilization module.

Block 606 depicts determining that the number of operators in the query does not exceed a threshold amount of operators. In some cases, the number of operators may be selectively applied, such as when certain types of operators are determined to be a primary factor in capacity utilization, over other operators which may have little or no influence.

Block 608 depicts determining that the maximum nesting level in the query has not exceeded the parameters of the model. This may refer to operators that take other operators as operands. In some cases, operands in looping constructs may be treated as a similarly important attribute.

Block 610 depicts determining that, for certain operators, the maximum number of operands has not been exceeded. For example, operators such as the "IN" operator may utilize the CPU in proportion to the number of operands. Accordingly, conformance with the input/output utilization model may depend on the number of operands falling within some range.

Next, as depicted by block 612, the provisioning module may determine that performing the query is not likely to cause the maximum capacity utilization of the query to be exceeded. The determination may be made by the operation depicted in block 614, which depicts using the input/output utilization model to correlate CPU utilization to a representative amount of input/output utilization. The model may be used to form a second value which is indicative of the correlation, and may be compared to a value used to represent available input/output capacity, such as the number of tokens in the token bucket associated with the account. For example, a scaling factor may be used to correlate CPU utilization to the representative amount of input/output utilization. The scaling factor may be in units of input/output utilization per CPU utilization, for example.

Figure 7:
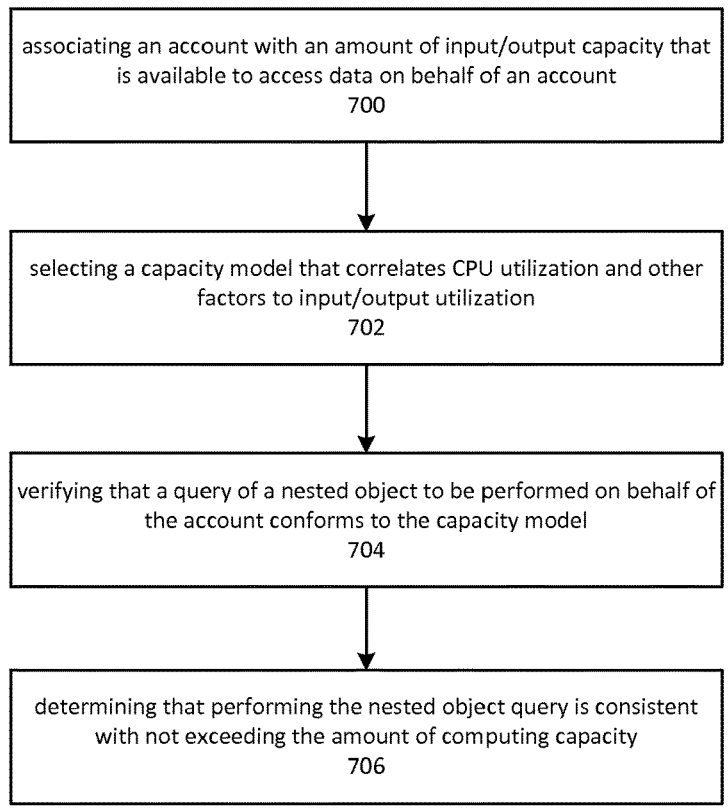
FIG. 7 is a flow diagram depicting a process for using a capacity model to determine if a query may be performed on behalf of an account.

FIG. 7 is a flow diagram depicting a process for using a capacity model to determine if a query may be performed on behalf of an account. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 700 depicts associating an account with an amount of input/output capacity that is available to access data on behalf of an account. This may, for example, involve associating an input/output-based token bucket with the account.

Block 702 depicts selecting a capacity model that correlates CPU utilization, and other factors, to input output utilization. In other words, the model allows information indicative of input/output utilization, such as the size of a nested object, to be adjusted or scaled so that it represents an equivalently "expensive" amount of input/output utilization. A token bucket or other mechanism for gating capacity utilization may be based on input/output utilization, but may be used when factors other than input/output utilization are controlling factors in the capacity of a computing node.

Selecting a model may comprise determining a factor by which an indicator of input/output utilization, such as the size of a nested object, may be adjusted. This may be derived by executing queries of possessing various attributes and determining a range of values for which the model is accurate.

It may be the case that input/output utilization is an accurate basis for predicting the overall cost of executing a query, according to some scaling factor or model, within certain query attribute ranges for which utilization measures other than input/output utilization are not bottlenecks. The range of query attributes may be determined by various means, including by monitoring various utilization measures of the system as various queries, with various query attributes, are executed. For example, a query comprising a number of operators, a number of operands, and a nesting level may be executed. It may then be determined that CPU is below a bottleneck percentage for those numbers of operators, operands, and the nesting level. Ranges or threshold values for the query attributes may be set accordingly. Models may also be validated based on testing procedures, such as executing a query, measuring the computing capacity utilized performing the query, and determining that the capacity model is consistent with the computing capacity that was utilized performing the query.

Block 704 depicts verifying that a query of a nested object to be performed on behalf of the account conforms to a capacity model that correlates CPU utilization to input/output utilization. As noted, the model may be accurate for certain ranges of values for various attributes of the query, such as the number of operators, the number of operands, and the nesting level. Certain operators may be identified and reflected in the model, such as update expressions and "IN" operators. The provisioning module may analyze attributes of the query corresponding to these expressions and operators to determine if the attributes fall within specified ranges.

Block 706 depicts determining that performing the nested object query is consistent with not exceeding the amount of computing capacity. The determination may be made using the capacity model to estimate an amount of capacity that may be used to perform the query. The input to the model may be input/output utilization, which may then be adjusted using the model to a scaled amount of input/output utilization that is indicative of a correlation between CPU utilization, and possibly other capacity utilization factors, and input/output utilization.

In some instances, application of the model may involve estimating the amount of capacity to be used performing the query by multiplying a value indicative of a size of the at least one nested object multiplied by an adjustment factor indicative of a complexity of the query, as reflected by attributes of the query including the number of operators, the number of operands, and nesting levels.

Figure 8:
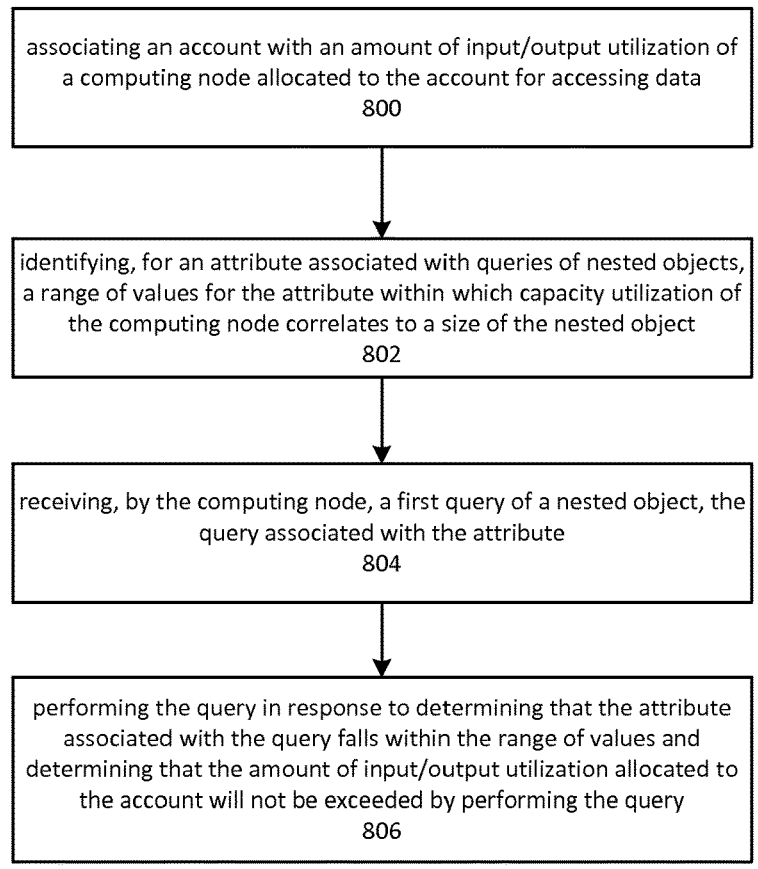
FIG. 8 is a flow diagram depicting a process for validating and using a capacity model.

FIG. 8 is a flow diagram depicting a process for validating and using a capacity model. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 800 depicts associating an account with an amount of input/output utilization of a computing node allocated to the account for accessing data.

Block 802 depicts identifying, for an attribute associated with queries of nested objects, a range of values for the attribute within which capacity utilization of the computing node correlates to a size of the nested object.

In some instances, the operations of block 802 may involve determining that central processing utilization will not exceed a threshold amount when the attribute is within the range of values. In other words, a capacity utilization model may be accurate so long as CPU utilization is not contributing to a bottleneck, which may occur when CPU utilization exceeds a threshold value such as (for example) 99%.

Block 804 depicts receiving, by the computing node, a first query of a nested object, the query associated with the attribute. The attribute may pertain to the number of operators, the number of operands, the nesting level, the presence of certain operators, and so forth.

Block 806 depicts performing the query in response to determining that the attribute associated with the query falls within the range of values and determining that the amount of input/output utilization allocated to the account will not be exceeded by performing the query.

Figure 9:
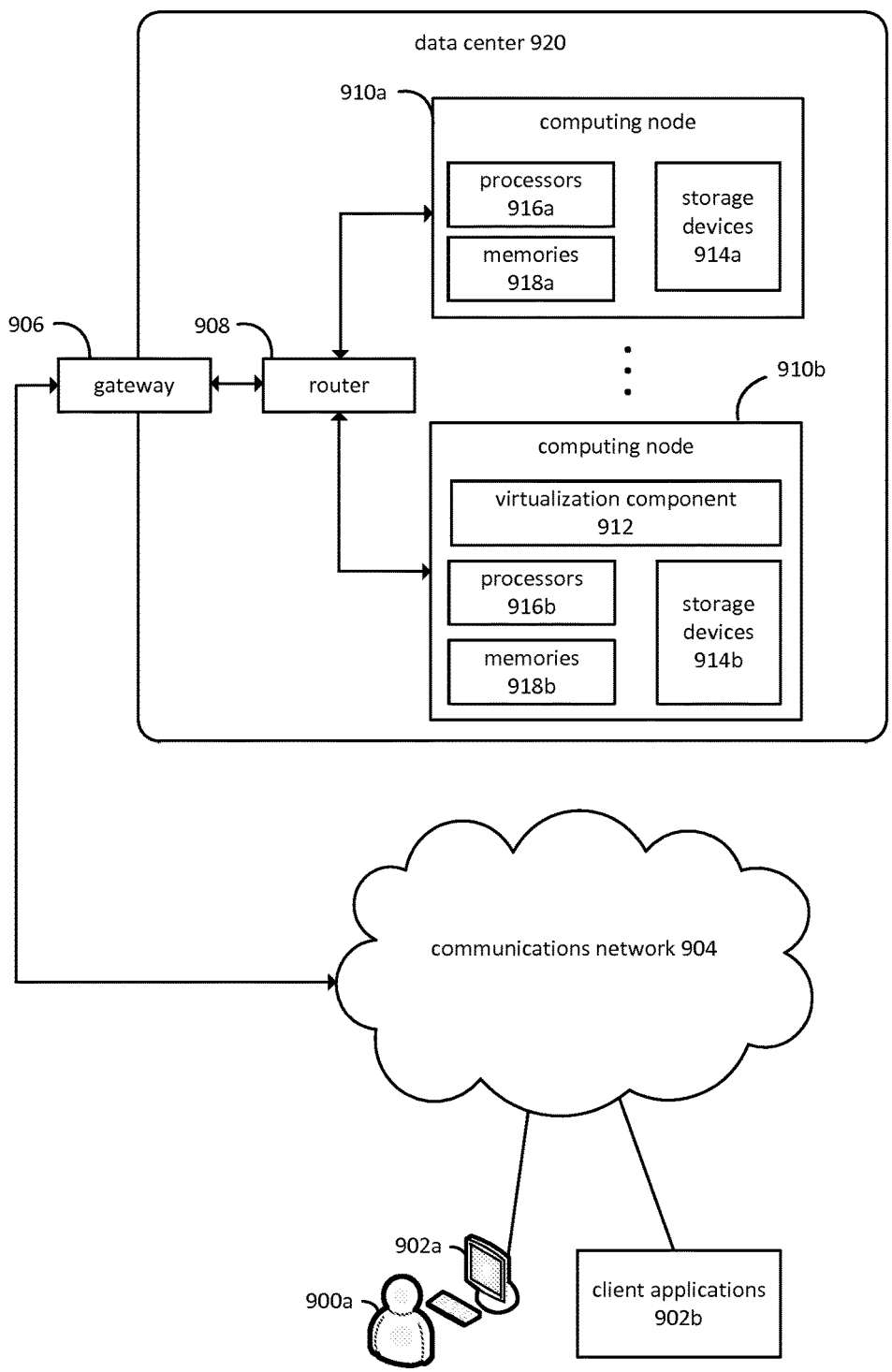
FIG. 9 is a block diagram depicting an embodiment of a computing environment in which aspects of the present disclosure may be practiced.

FIG. 9 is a diagram depicting an example of a distributed computing environment on which aspects of the present invention may be practiced. Various users 900a may interact with various client applications, operating on any type of computing device 902a, to communicate over communications network 904 with processes executing on various computing nodes 910a and 910b within a data center 920. Alternatively, client applications 902b may communicate without user intervention. Communications network 904 may comprise any combination of communications technology, including the Internet, wired and wireless local area networks, fiber optic networks, satellite communications, and so forth. Any number of networking protocols may be employed.

Communication with processes executing on the computing nodes 910a and 910b may be provided via gateway 906 and router 908. Numerous other network configurations may also be employed. Although not explicitly depicted in FIG. 9, various authentication mechanisms, web service layers, business objects, or other intermediate layers may be provided to mediate communication with the processes executing on computing nodes 910*a* and 910*b*. Some of these intermediate layers may themselves comprise processes executing on one or more of the computing nodes. Computing nodes 910*a* and 910*b*, and processes executing thereon, may also communicate with each other via router 908. Alternatively, separate communication paths may be employed. In some embodiments, data center 920 may be configured to communicate with additional data centers, such that the computing nodes and processes executing thereon may communicate with computing nodes and processes operating within other data centers.

Computing node 910*a* is depicted as residing on physical hardware comprising one or more processors 916*a*, one or more memories 918*a*, and one or more storage devices 914*a*. Processes on computing node 910*a* may execute in conjunction with an operating system or alternatively may execute as a bare-metal process that directly interacts with physical resources, such as processors 916*a*, memories 918*a*, or storage devices 914*a*.

Computing node 910*b* may comprise a virtualization component 912, which may include a virtual machine host and virtual machine instances to provide shared access to various physical resources, such as physical processors, memory, and storage devices. These resources may include the depicted processors 916*b*, memories 918*b*, and storage devices 914*b*. Any number of virtualization mechanisms might be employed to provide shared access to the physical resources.

The various computing nodes depicted in FIG. 9 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented without the use of virtualization, computing nodes may include one or more memories configured to store computer-readable instructions and one or more processors configured to read and execute the instructions. A computing node may also comprise one or more storage devices, network interfaces, communications buses, user interface devices, and so forth. Computing nodes may also utilize virtualized computing resources, such as virtual machines implemented with or without a hypervisor, virtualized bare-metal environments, and so forth. A virtualization-based computing node therefore encompasses both the virtualization resources and the physical hardware needed to execute the virtualization resources. A computing node may be configured to execute an operating system and application programs. In some embodiments, a computing node might also comprise bare-metal application programs.

Figure 10:
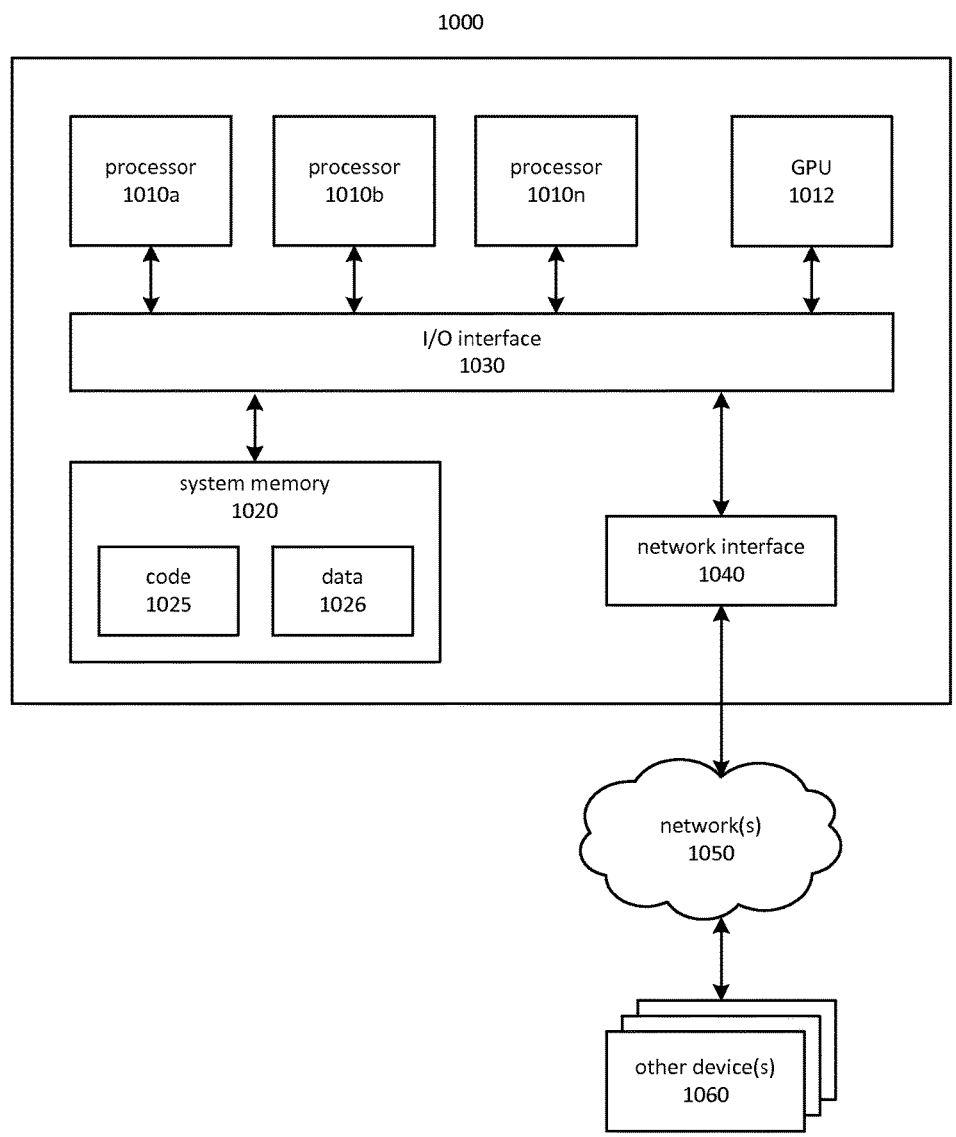
FIG. 10 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 10 depicts a general-purpose computer system that includes or is configured to access one or more computer-accessible media. In the illustrated embodiment, computing device 1000 includes one or more processors 1010*a*, 1010*b*, and/or 1010*n* (which may be referred herein singularly as a processor 1010 or in the plural as the processors 1010) coupled to a system memory 1020 via an input/output ("I/O") interface 1030. Computing device 1000 further includes a network interface 1040 coupled to I/O interface 1030.

In various embodiments, computing device 1000 may be a uniprocessor system including one processor 1010 or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures ("ISAs"), such as the x86, PowerPC, SPARC or MIPS ISAs, or any other suitable ISA. In multiprocessor systems, each of processors 1010 may commonly, but not necessarily, implement the same ISA.

In some embodiments, a graphics processing unit ("GPU") 1012 may participate in providing graphics rendering and/or physics processing capabilities. A GPU may, for example, comprise a highly parallelized processor architecture specialized for graphical computations. In some embodiments, processors 1010 and GPU 1012 may be implemented as one or more of the same type of device. In some instances, the GPU 1012 may perform calculations and execute instructions in cooperation with or in place of the processor 1010. Accordingly, as used herein, the term processor may encompass a GPU. Similarly, other highly parallelized processor architectures that supplement or replace the operation of the primary processor 1010 are also encompassed by the term processor.

System memory 1020 may be configured to store instructions and data accessible by processor(s) 1010. In various embodiments, system memory 1020 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 1020 as code 1025 and data 1026.

In one embodiment, I/O interface 1030 may be configured to coordinate I/O traffic between processor 1010, system memory 1020, and any peripherals in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect ("PCI") bus standard or the Universal Serial Bus ("USB") standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 1060 attached to a network or networks 1050, such as other computer systems or devices, for example. In various embodiments, network interface 1040 may support communication via any suitable wired or wireless general data networks, such as types of Ethernet networks, for example. Additionally, network interface 1040 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 1020 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 1000 via I/O interface 1030. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals, such as electrical, electromagnetic or digital signals, conveyed via a communication medium, such as a network and/or a wireless link, such as those that may be implemented via network interface 1040. Portions or all of multiple computing devices, such as those illustrated in FIG. 10, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

The computing device 1000 may be configured by software instructions to contain a module (not shown). A module is a component of the computing device 1000 that includes a set of instructions, loaded in whole or in part into system memory 1020, for performing a set of related functions, including input and output with other modules. The code 1025 and data 1026 of system memory 1020 are altered by the loading of the instructions. The operation of a module is effected by interchange between processor 1010, or in a multiprocessor system 1010a-1010n and/or GPU 1012, and the system memory 1020 via I/O interface 1030. A module may interact with other modules of the computing device 1000 via system memory 1020, and with other devices 1060 via network interface 1040 and network 1050.

A compute node, which may be referred to also as a computing node, may be implemented on a wide variety of computing environments, such as tablet computers, personal computers, smartphones, game consoles, commodity-hardware computers, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, instructions executed by one or more computers or computer processors. The instructions may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software instructions and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the instructions, systems, and data structures may also be stored (e.g., as software instructions or structured data) on a computer-readable medium, such as a hard disk, a memory, a network, or a portable media article to be read by an appropriate device or via an appropriate connection. The instructions, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for controlling capacity utilization of a database maintaining a collection of nested objects, the system comprising:
   a storage device; and
   one or more computing nodes that process requests to store and retrieve the nested objects on the storage device, wherein the one or more computing nodes at least:

store an association between an account and a first value indicative of a maximum amount of input/output capacity that may be used access data on behalf of the account;

receive a request to access at least one of the nested objects stored on the storage device, the request comprising a query and information indicative of the association;

verify that the query conforms to an input/output utilization model by at least determining that a number of operators in the query does not exceed a first threshold amount, determining that a nesting level of the query does not exceed a second threshold amount, and determining that a number of operands in the query do not exceed a third threshold amount;

form a second value based at least in part on the input/output utilization model, the second value indicative of a correlation between central processing unit utilization and an amount of input/output utilization that can be compared to the first value; and determine to perform the query based at least in part on comparing the second value to the first value.

2. The system of claim 1, wherein the one or more computing nodes at least:
form the second value by multiplying a value indicative of a size of the at least one of the nested objects multiplied by an adjustment factor indicative of a complexity of the query.

3. The system of claim 1, wherein the one or more computing nodes at least:
execute a second query comprising a first number of operators, a first number of operands, and a first nesting level;
determine that central processing unit utilization is below a bottleneck percentage for the first number of operators, the first number of operands, and the first nesting level; and
set the first threshold amount, the second threshold amount, and the third threshold amount based on the determination that the central processing unit utilization is below the bottleneck percentage.

4. The system of claim 1, wherein the one or more computing nodes at least:
receive a second request to access a scalar value; and
determine that performing the second request is not estimated to cause the maximum amount of input/output capacity to be exceeded, based at least in part on a size of the scalar value.

5. The system of claim 1, wherein the one or more computing nodes at least:
determine an amount of input/output utilization that is sustainable on the one or more computing nodes;
determine an amount of central processing unit utilization that is sustainable on the computing node; and
determine a first range of values for the first threshold amount, a second range of values for the second threshold amount, and a third range of values for the third threshold amount for which the input/output utilization model may be used to correlate the amount of central processing unit utilization that is sustainable to the amount of input/output utilization that is sustainable.

6. A method for controlling computing capacity used to access nested objects stored in a repository, the method comprising:

associating an account with an amount of computing capacity that may be used to access data on behalf of the account;

verifying that a query involving of at least one nested object among the nested objects to be performed on behalf of the account conforms to a capacity model, wherein the verification comprises determining that a number of operators in the query does not exceed a first threshold amount, determining that a nesting level of the query does not exceed a second threshold amount, and determining that a number of operands in the query does not exceed a third threshold amount;

estimating, based at least in part on the capacity model, an amount of capacity to be used performing the query; and determining to perform the query based at least in part on the estimated amount of capacity not exceeding the amount of computing capacity that may be used to access data.

7. The method of claim 6, further comprising:
estimating the amount of capacity to be used performing the query by multiplying a value indicative of a size of the at least one nested object multiplied by an adjustment factor indicative of a complexity of the query.

8. The method of claim 6, further comprising:
executing a second query comprising a first number of operators, a first number of operands, and a first nesting level;
determining that central processing unit utilization is below a bottleneck percentage for the first number of operators, the first number of operands, and the first nesting level; and
setting the first threshold amount, the second threshold amount, and the third threshold amount based on the determination that the central processing unit utilization is below the bottleneck percentage.

9. The method of claim 6, further comprising:
receiving a second request to access a scalar value stored in the repository; and
determining that performing the second request is not estimated to cause the amount of computing capacity that may be used to be exceeded, based at least in part on a size of the scalar value.

10. The method of claim 6, further comprising:
obtaining information indicative of computing capacity utilized performing the query; and
determining that the capacity model is consistent with the computing capacity utilized performing the query.

11. The method of claim 6, wherein the verification comprises counting operands provided to an IN operator of the query.

12. The method of claim 6, wherein the verification comprises determining that an update expression of the query contains less than a fourth threshold amount of operators.

13. The method of claim 6, further comprising:
determining to not perform a second query in response to determining that the second query does not conform to the capacity model.

14. The method of claim 6, further comprising:
forming a model that correlates input/output utilization to central processing unit utilization for a range in which the number of operators in the query does not exceed the first threshold amount, the nesting level of the query does not exceed the second threshold amount, and the number of operands in the query does not exceed the third threshold amount.

15. A method comprising:
associating an account with an amount of input/output utilization of a computing node allocated to the account for accessing data;
identifying, for an attribute associated with queries of nested objects, a range of values for the attribute, wherein size of a nested object is determined to be predictive of capacity utilized by performing a query in which the attribute has a value that falls within the range;
receiving, by the computing node, a first query of a nested object, the first query associated with the attribute;
estimating capacity to be used performing the first query in response to determining that the attribute associated with the first query falls within the range of values; and
determining that the amount of input/output utilization allocated to the account will not be exceeded by performing the first query.

16. The method of claim 15, further comprising:
determining that central processing utilization will not exceed a threshold amount when the attribute is within the range of values.

17. The method of claim 15, wherein the attribute associated with the first query comprises one of a number of operators, a number of operands, and a nesting level.

18. The method of claim 15, further comprising:
determining to not perform a second query in response to determining that the attribute associated with the first query falls outside the range of values.

19. The method of claim 15, further comprising:
forming a value indicative of an estimated total capacity of the computing node to be used performing the first query, the value based at least in part on the size of the nested object multiplied by an adjustment factor indicative of a complexity of the query.

* * * * *